United States Patent
Chang

(10) Patent No.: US 6,273,285 B1
(45) Date of Patent: Aug. 14, 2001

(54) STRUCTURE OF A WHISTLING DEVICE FOR A COOKER LID

(76) Inventor: Min Lan Chang, PMB #1008, 1867 Ygnacio Valley Rd., Walnut Creek, CA (US) 94598

( * ) Notice: Subject to any disclaimer, the term of this patent is extended or adjusted under 35 U.S.C. 154(b) by 0 days.

(21) Appl. No.: 09/575,244

(22) Filed: May 22, 2000

Related U.S. Application Data

(63) Continuation-in-part of application No. 09/407,873, filed on Sep. 29, 1999, now Pat. No. 6,202,875.

(51) Int. Cl.[7] ................................................. A47J 27/212
(52) U.S. Cl. ................ 220/203.05; 220/912; 116/137 R; 116/70; 99/344
(58) Field of Search ............................ 220/573.1, 203.05, 220/203.04, 203.19, 203.29, 203.27, 367.1, 373, 374, 912, 913; 215/311, 312, 313; 116/137 R, 70, 266, 67 R, 264, 265, 101, 102, 103, 112; 99/342–344

(56) References Cited

U.S. PATENT DOCUMENTS

| | | | |
|---|---|---|---|
| 3,827,596 | * | 8/1974 | Powers, Jr. . |
| 4,418,637 | * | 12/1983 | Heermans ............................ 116/70 |
| 4,586,455 | * | 5/1986 | Shibata ............................ 116/67 R |
| 4,690,095 | * | 9/1987 | Walls et al. ........................ 116/67 R |
| 4,776,296 | * | 10/1988 | Heermans ............................ 116/70 |
| 4,857,897 | * | 8/1989 | Chen . |
| 5,471,912 | * | 12/1995 | Lin ........................................ 99/344 |
| 6,004,000 | * | 12/1999 | Hupf et al. ............................ 116/70 |
| 6,202,875 | * | 3/2001 | Chang ................................ 220/912 |

* cited by examiner

*Primary Examiner*—Nathan J. Newhouse
(74) *Attorney, Agent, or Firm*—A & J

(57) ABSTRACT

A whistling device for a cooker includes a cooker lid, an annular block, a handle block, and a screw, characterized in that the cooker lid is circular and is having a center opening and a venting hole; the annular block is circular and has a circular opening, an annular groove at a bottom of the annular block, a venting recess in communication with the annular groove, and a protruded arch on a top of the annular block and located above the venting recess; the handle block is generally circular in shape and has a protrusion extending downwardly from a center of a bottom thereof, the protrusion being formed with a center threaded hole aligned with the center opening of the cooker lid, the protrusion being sized to fit within the center opening of the annular block and formed with an annular slot for receiving the annular block, the handle block having a venting recess at a bottom thereof in alignment with the venting recess of the annular block and an arch-shaped slot slidably engaged with the protruded arch of the annular block, the handle block having an arch-shaped handle diametrically mounted across the edge thereof; and a screw extending upwardly through the center opening of the cooker lid to engage with the threaded hole of the handle block.

1 Claim, 4 Drawing Sheets

STRUCTURE OF A WHISTLING DEVICE FOR A COOKER LID

CROSS-REFERENCE

This invention is a continuation-in-part of the pending application Ser. No. 09/407,873, now U.S. Pat. No. 6,202,875, filed Sep. 29, 1999 owned by the same inventor.

BACKGROUND OF THE INVENTION a) Technical Field of the Invention

The present invention relates to a whistling device for a cooker lid and in particular, to a handle block mounted onto a cooker lid to adjust the size of an opening between the venting recess of a handle block and the venting recess of an annular block, so that the adjustment of the handle block of the cooker lid can control the volume of the sound and the amount of hot air released from a cooker.

b) Description of the Prior Art

Recently, various types of safety devices and alarming devices are provided to cooking utensils in order to provide safety and convenience to the user. Frequently, a whistle is provided to the cooker lid so that the hot air produced during cooking provides an alarming sound to alert the user. However, for cooker lids having a glass window, no whitling device is provided as a result of its complicated structure. There is only an air vent provided on the cooker lid. If a whistling device is to be mounted onto the glass mounted cooker lid, the structure of the whistling device may be very complicated and expensive to manufacture.

Therefore, it is an object of the present invention to provide an improvement in the structure of a whistling device for a cooker lid which can obviate and mitigate the above-mentioned drawbacks.

SUMMARY OF THE INVENTION

It is the primary object of the present invention to provide a whistling device for a cooker includes a cooker lid, an annular block, a handle block, and a screw, characterized in that the cooker lid is circular and is having a center opening and a venting hole; the annular block is circular and has a circular opening, an annular groove at a bottom of the annular block, a venting recess in communication with the annular groove, and a protruded arch on a top of the annular block and located above the venting recess; the handle block is generally circular in shape and has a protrusion extending downwardly from a center of a bottom thereof, the protrusion being formed with a center threaded hole aligned with the center opening of the cooker lid, the protrusion being sized to fit within the center opening of the annular block and formed with an annular slot for receiving the annular block, the handle block having a venting recess at a bottom thereof in alignment with the venting recess of the annular block and an arch-shaped slot slidably engaged with the protruded arch of the annular block, the handle block having an arch-shaped handle diametrically mounted across the edge thereof; and a screw extending upwardly through the center opening of the cooker lid to engage with the threaded hole of the handle block.

It is another object of the present invention to provide a whistling device of a cooker lid which can mitigate the drawbacks of the conventional cooker lid with alarming device.

The various features of novelty which characterize the invention are pointed out with particularity in the claim annexed to and forming a part of this disclosure. For a better understanding of the invention, its operating advantages and specific objects obtained by its uses, references is made to the accompanying drawings and descriptive matter in which preferred embodiment of the invention is illustrated.

DETAILED DESCRIPTION OF THE PREFERRED EMBODIMENT

Figure 1:
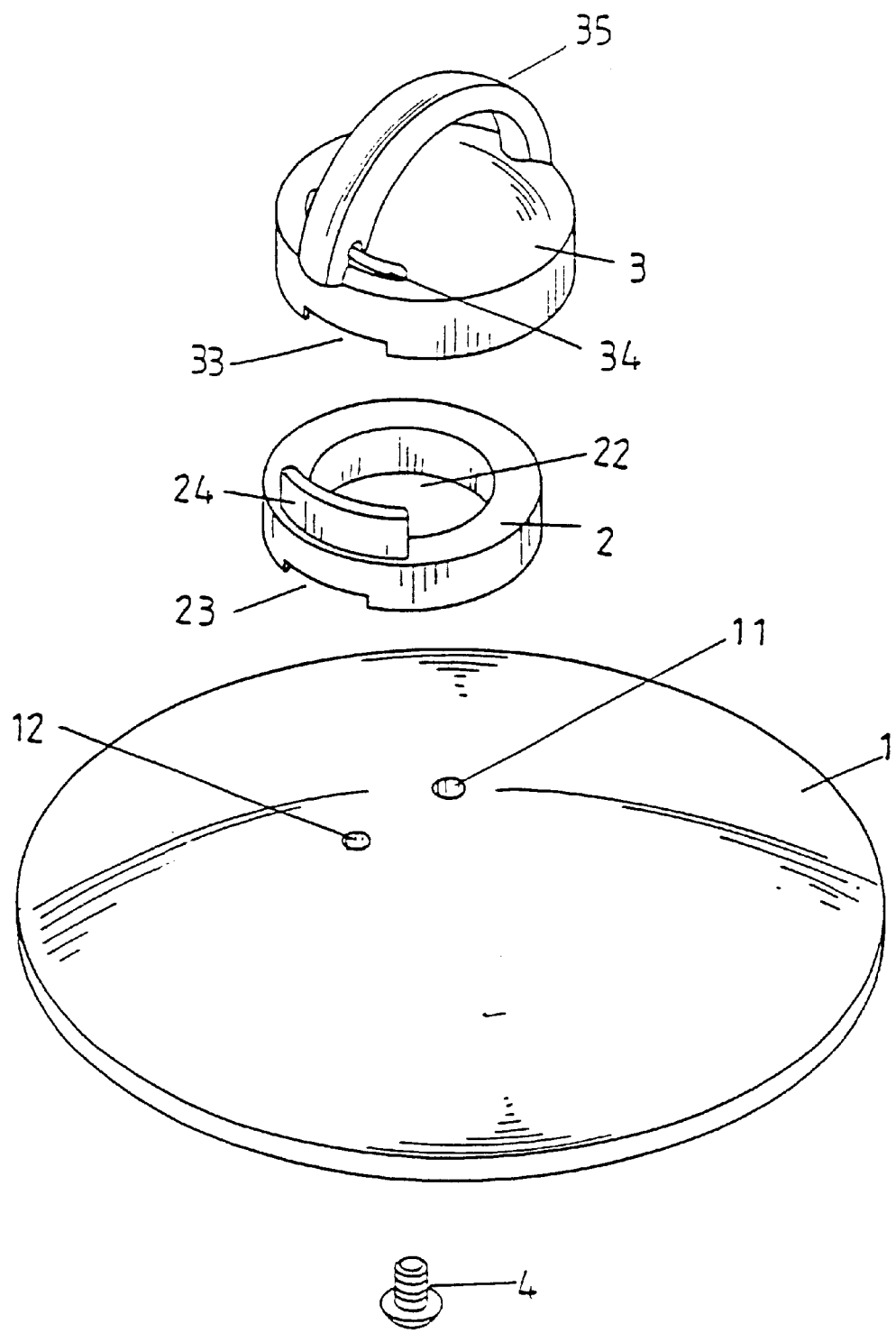
FIG. 1 is an exploded view of a preferred embodiment of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
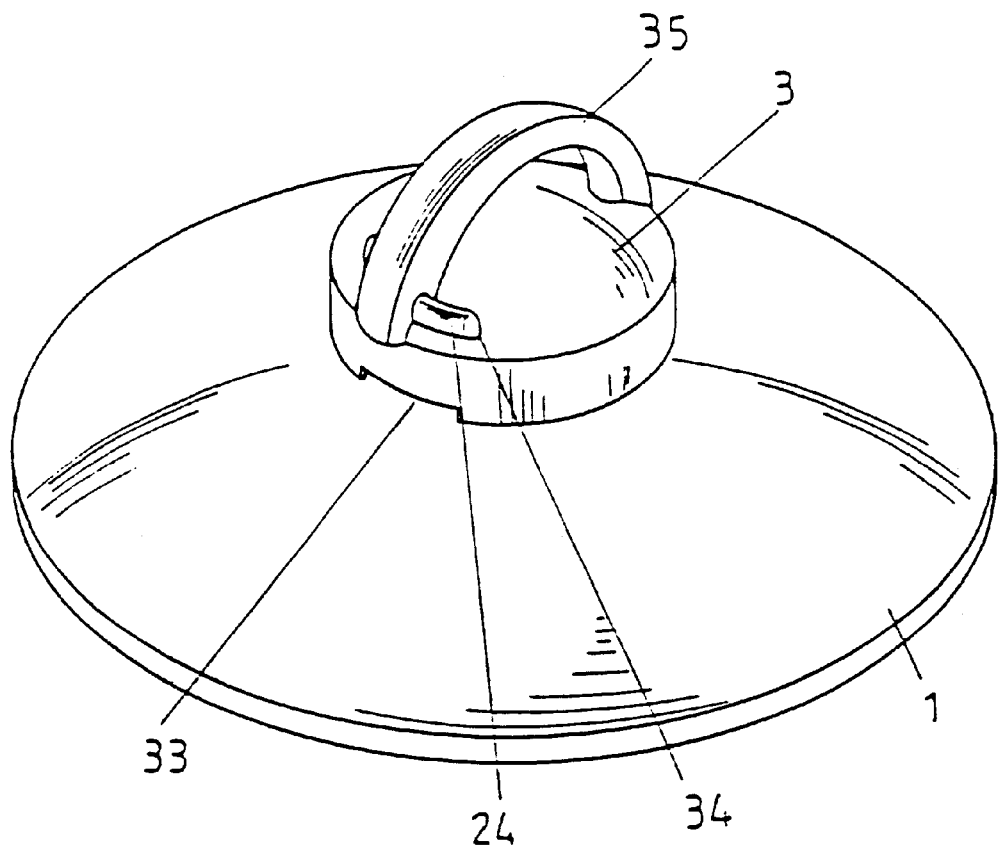
FIG. 2 is a perspective view of the preferred embodiment of the present invention.
Figure 3:
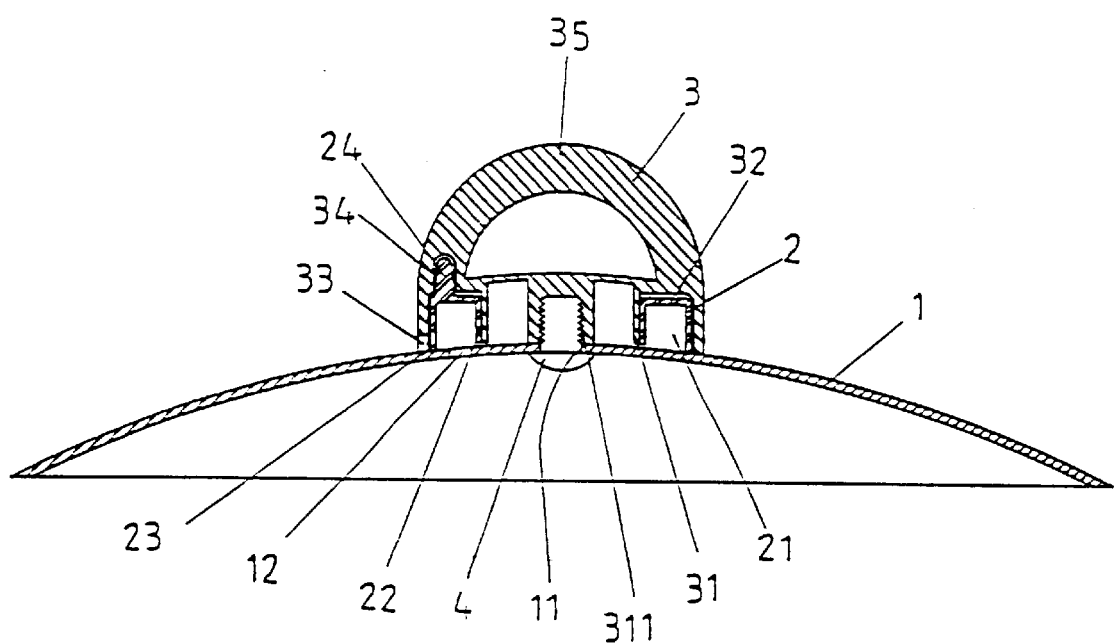
FIG. 3 is a sectional view of the preferred embodiment of the present invention.

Referring to FIGS. 1, 2 and 3, there is shown the improved whistling device for a cooker according to the present invention comprising a cooker lid 1, an annular block 2 and a handle block 3. The cooker lid 1 is circular member having a center opening 11 in alignment with a threaded hole 311 of a protrusion 31 extending downwardly from the central portion of the bottom of the handle block 3. A screw 4 extends upwardly through the center opening 11 to engage with the threaded hole 311 so as to keep the handle block 3 in place. The cooker lid 1 is further formed with a venting hole 12 which is aligned with an annular groove 21 formed on the bottom of the annular block 2 so that the hot air can be released from the cooker to the outside through the venting hole 12 and the annular groove 21.

The annular block 2 is sized so that it can be just fitted into an annular slot 32 formed on the bottom of the handle block 3. The annular block 2 has a circular opening 31 allowing the passage of the protrusion 31 of the handle block 3 so that the threaded hole 31 at the center of the protrusion 31 is aligned with the center hole 11 of the cooker lid 1. The bottom of the annular block 2 has a venting recess 23 in communication with the annular groove 21 and in alignment with a venting recess 33 at the bottom of the handle block 3. The top of the annular block 2 has a protruded arch 24 located above the venting recess 23 and configured to be slidably fitted into an arch-shaped slot 34 provided at the top of the handle block 23, so that the annular block 2 can be moved by pushing the protruded arch 24 for adjusting the opening between the venting recesses 33 and 23 thereby achieving the purpose of controlling the flowrate of the hot air passing therethrough.

The handle block 3 is generally circular in shape and has a protrusion 31 extending downwardly from the center of its bottom formed with a center threaded hole 311 aligned with the center opening 11 of the cooker lid 1. The protrusion 31 is sized so that it can be fitted within the center opening 22 of the annular block 2. The protrusion 31 is formed with an annular slot 32 for receiving the annular block 2. The handle block 3 has a venting recess 33 at the bottom in alignment with the venting recess 23 of the annular block and an arch-shaped slot 34 slidably engaged with the protruded arch 24 of the annular block 2. Further, the handle block 3 has an arch-shaped handle 35 diametrically mounted across the edge thereof.

Figure 4:
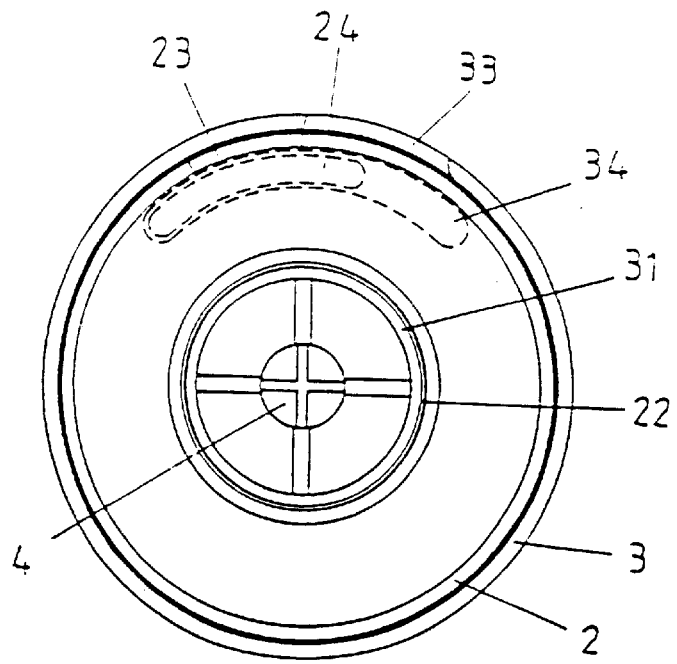
FIGS. 4A and 4B are schematic views illustrating the opening of air hole for air releasing in accordance with the present invention.
Figure 4:
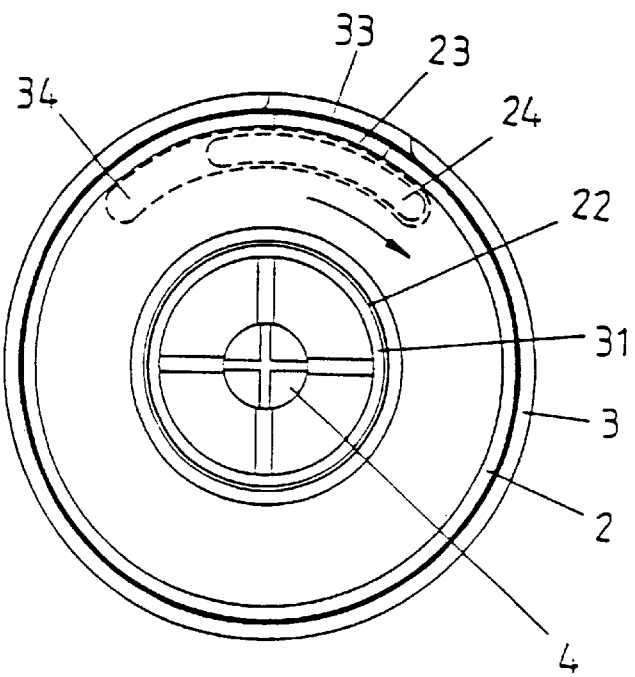

In accordance with the present invention, FIGS. 3, 4A and 4B show the combination and application of the whistling device of a cooker lid. The protrusion 31 of the handle block 3 is inserted into the circular opening 22 of the annular block 2 and the entire annular block 2 is covered by the bottom of the handle block 3. The protruded arch 24 of the annular block 2 is inserted within the arch-shaped slot 34 of the handle block 3 such that the protruded arch 24 is moveable within the arch-shaped slot 34. The venting recess 23 of the annular block 2 is aligned with the venting recess 33 of the handle block 3. By sliding the protruded arch 24 of the annular block 2, the amount of the air released out from the opening between the venting recesses 23 and 33 can be controlled.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A whistling device for a cooker comprising a cooker lid, an annular block, a handle block, and a screw, wherein
   (a) said cooker lid is circular and has a center opening and a venting hole;
   (b) said annular block is circular and has a circular opening, an annular groove at a bottom of said annular block a venting recess in communication with said annular groove, and a protruded arch on a top of said annular block and located above said venting recess;
   (c) said handle block is generally circular in shape and has a protrusion extending downwardly from a center of a bottom thereof, said protrusion being formed with a center threaded hole aligned with said center opening of said cooker lid, said protrusion being sized to fit within said center opening of said annular block and formed with an annular slot for receiving said annular block, said handle block having a venting recess at a bottom thereof in alignment with said venting recess of said annular block and an arch-shaped slot slidably engaged with said protruded arch of said annular block, said handle block having an arch-shaped handle diametrically mounted across said edge thereof; and
   (d) a screw extending upwardly through said center opening of said cooker lid to engage with said threaded hole of said handle block.

* * * * *